INVENTOR:
CARL G. STRANDLUND

May 18, 1943.  C. G. STRANDLUND  2,319,755
HITCH DEVICE
Filed June 20, 1940  3 Sheets-Sheet 3

INVENTOR:
CARL G. STRANDLUND
BY
ATTORNEYS.

Patented May 18, 1943

2,319,755

UNITED STATES PATENT OFFICE 2,319,755

HITCH DEVICE

Carl G. Strandlund, Moline, Ill., assignor to Deere & Company, Moline, Ill., a corporation of Illinois Appication June 20, 1940, Serial No. 341,474

13 Claims. (Cl. 55—84)

This invention relates generally to agricultural implements and more particularly to harrows, drags and like implements.

The object and general nature of the present invention is the provision of an improved evener bar by which a plurality of harrow sections may be connected to a tractor or other source of power. More specifically, it is a feature of this invention to provide an evener of the folding type which may be manufactured inexpensively yet is of adequate strength to take care of all draft forces encountered. A further feature of this invention is to provide a folding evener which is made up of a number of identical parts, whereby the cost of manufacture is reduced and, further, it becomes a simple matter to provide an evener accommodating various numbers of harrow sections.

An additional feature of this invention is the provision of an improved hinge construction, wherein means is provided for maintaining the joints tight and in which certain of the hitch members may be connected rigidly with the association parts while the means establishing the pivot or pivots between the various sections of the evener are separate members. Further, it is another feature of this invention to provide means whereby the sections of the evener may be adjusted so as to be brought into and retained in end-to-end alignment. Also, an additional feature of this invention is the provision of means limiting the pivotal or folding movement of one or more of the evener sections, and in addition it is another feature of this invention to provide means for holding the evener sections in aligned extended position.

These and other objects and advantages of the present invention will be apparent to those skilled in the art after a consideration of the following detailed description, taken in conjunction with the accompanying drawings.

Figure 1:
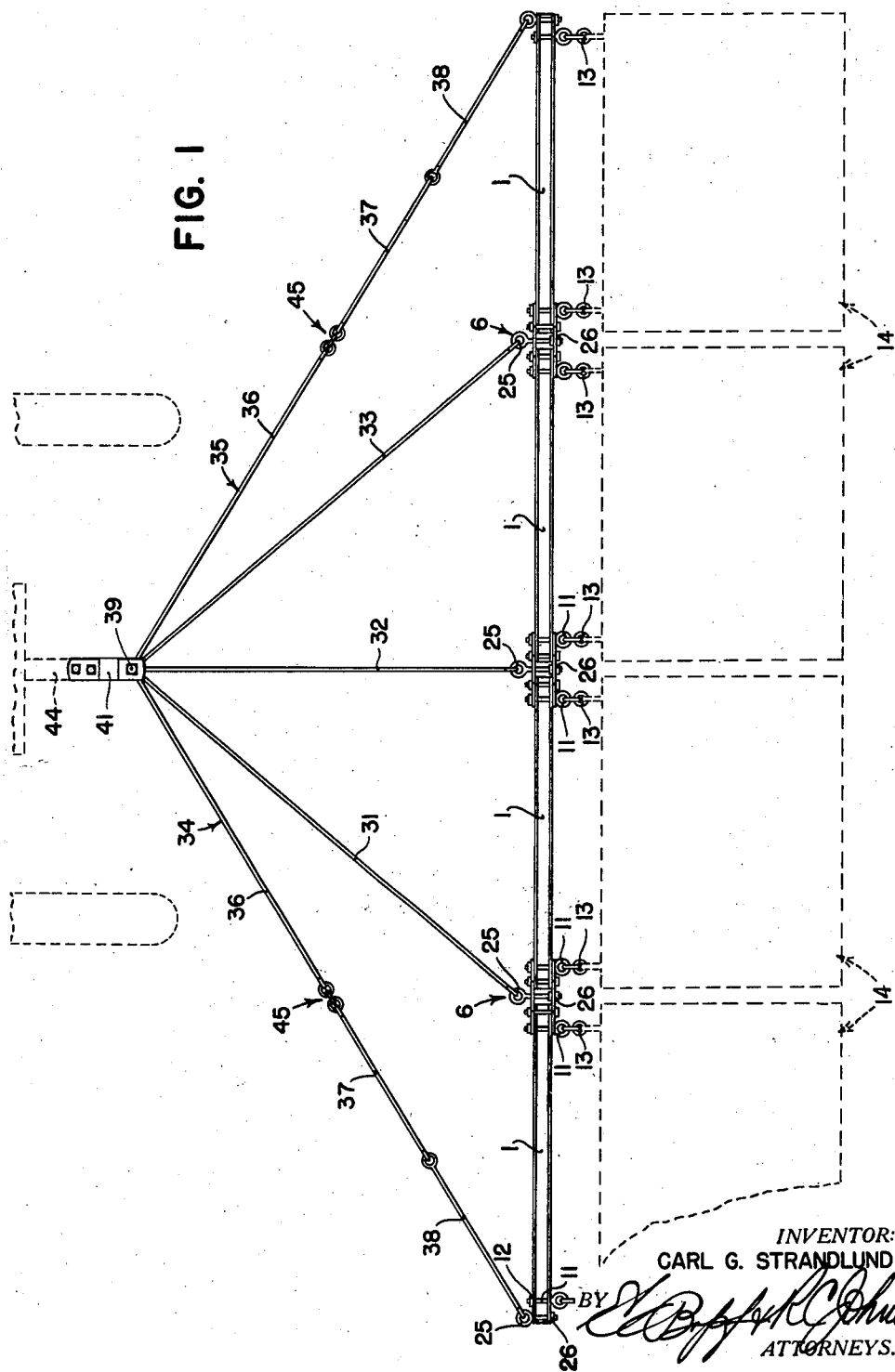
Figure 1 is a plan view of an evener in which the principles of the present invention have been incorporated.
Figure 2:
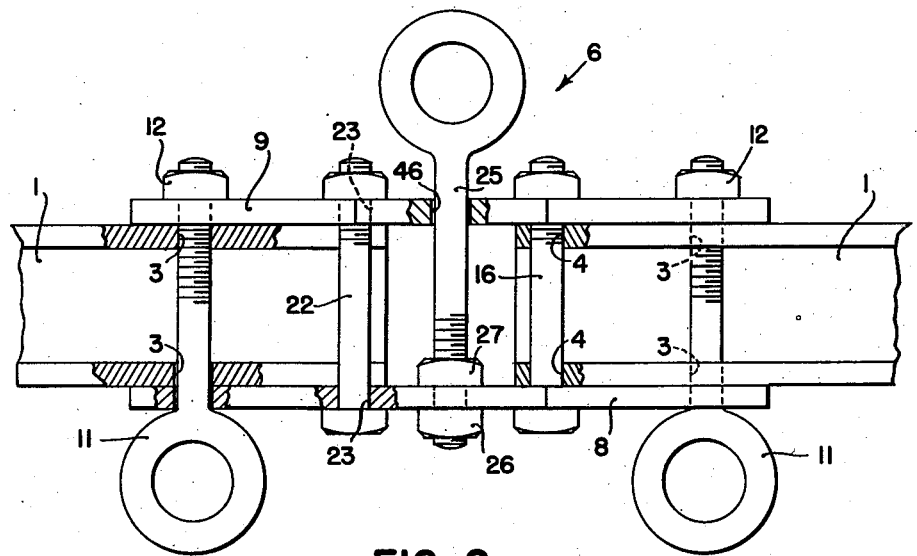
Figure 2 is an enlarged fragmentary view of the hinge construction between adjacent evener sections.

Referring now more particularly to Figures 1 and 2, the evener of the present invention comprises a plurality of channel sections 1, which preferably are identical parts. Each channel section 1 is provided at its opposite ends with a pair of openings 3 and 4 in each flange of the channel. The evener sections are connected together by a hinge construction indicated in its entirety by the reference numeral 6.

Figure 3:
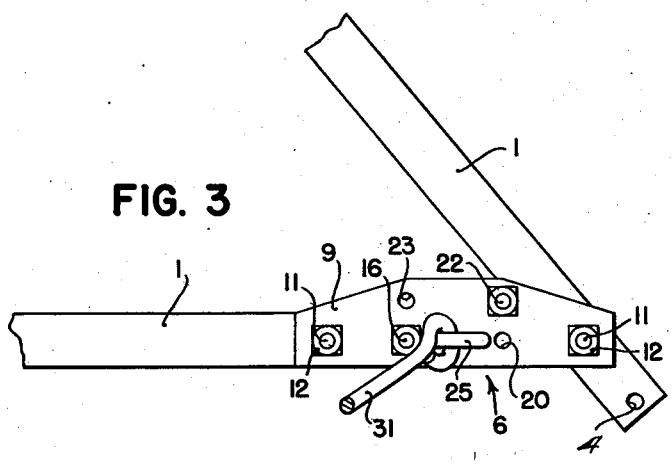
Figure 3 is an elevational view of two adjacent evener bar sections, one being folded or pivoted relative to the other.
Figure 4:
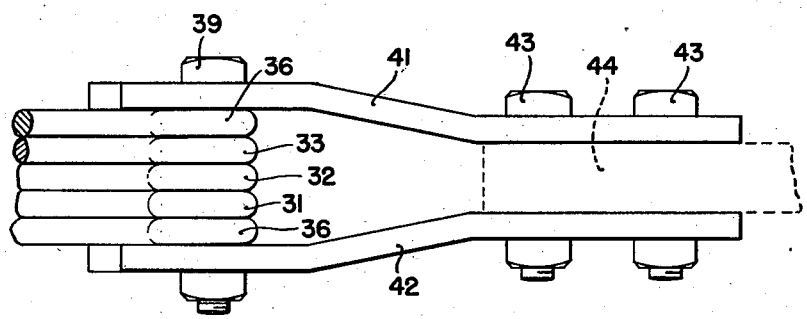
Figure 4 is a fragmentary view showing a part of the hitch of the evener.
Figure 5:
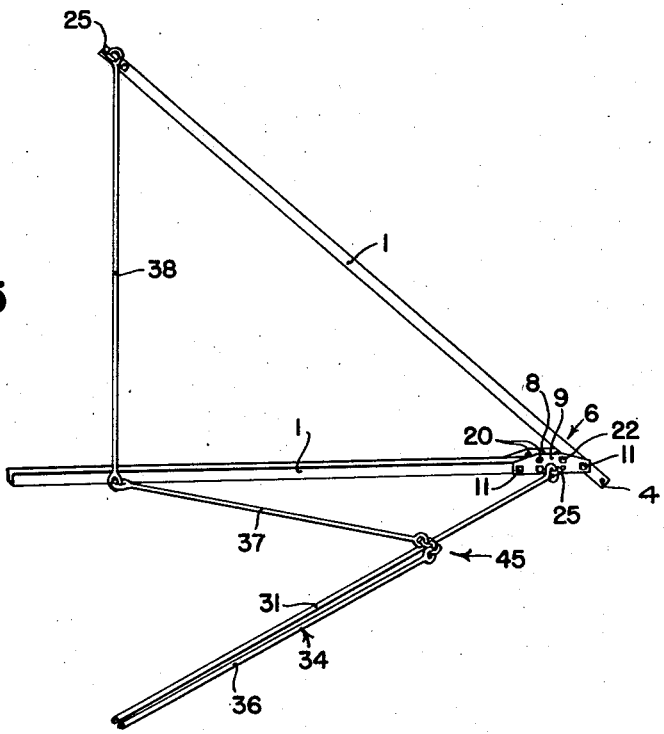
Figure 5 is a perspective view showing the manner in which the draft links accommodate the folding of the outer evener bar sections.

As best shown in Figures 2 and 3, each hinge consists of a pair of connecting plates 8 and 9, preferably identical, and each plate is provided with a number of apertures therein, there being seven in each plate. An eye-bolt 11 extends through the outermost opening in the rear connecting plate 8 and through the pair of openings 3 in the flanges of the associated channel 1. At their forward ends of the eyebolts are extended through the outermost holes in the forward connecting plate 9. The end of each eyebolt 11 is threaded and receives a nut 12 which is disposed on the front side of the forward connecting plate 9. These eyebolts 11 constitute draft members by which the pull is transmitted to the associated harrow sections, indicated by the reference numeral 14, the sections being connected with the eyebolts in any suitable manner desired, as by links 13. As best shown in Figure 3, the connecting plates 8 and 9 may be rigidly fastened to one of the evener sections by a bolt 16 which passes through the plates 8 and 9 and the openings 4 at the innermost end of the channel associated therewith, while the other eyebolt 11 may serve as a pivot defining an axis about which the other channel may swing relative to the first channel. If desired, both evener channels may be rigidly secured to the connecting plates, as by passing a bolt through the openings 20 in the connecting plates 8 and 9 and the openings 4 in the flanges of the associated channel. By this means the evener bars are locked in aligned extended relation. However, when one is pivoted to the connecting plates 8 and 9, as shown in Figure 3, it is desirable to provide a stop or the like, serving to limit the folding movement of the one evener bar relative to the other. In Figure 3 I have shown a bolt 22 extending through suitable apertures 23 in the connecting plates 8 and 9 and in a position to hold the pivoted channel section in the position indicated. This same bolt 22 may be inserted through the openings 20 and 4 if it is desired to secure the evener bars in an extended position.

The connecting plates 8 and 9 also are provided with central openings to receive a hitch member in the form of an eyebolt 25. This member 25 extends loosely through an opening 46 in the forward connecting plate 9 and through an aligned opening or aperture in the rear connecting plate 8 to which it is connected. The rear end of each eyebolt 25 is threaded and receives a pair of nuts 26 and 27, disposed on opposite sides of the rear connecting plate 8, which when tightened secure the bolt 25 firmly to the plate 8. Preferably, the eyebolt 25 at each hinge is threaded for a substantial distance along the shank of the bolt so that by loosening the forward nut 27 and threading the rear nut 26 forwardly, the position of the two connecting plates 8 and 9 on the eyebolt 25 may be adjusted. By tightening both nuts 26 and 27 against the rear connecting plate 8, the eyebolt 25 is rigidly secured against turning, and is thus rigidly connected to the evener at a point spaced from the axis of the pivot bolt (Figure 3). As will be understood, pivotal movement of the outer evener channel will have no tendency to turn the hitch member or eyebolt 25 associated therewith.

In the construction shown in Figure 1, there are four evener sections 1, and the two outermost sections are connected by hinge constructions 6 to the inner sections, the latter being rigidly connected together by plates 8 and 9, by passing two bolts through the connecting plates and the adjacent ends of the channels so as to keep both from pivoting relative to the connecting plates 8 as described above, each of the outer sections is pivoted on the next inner section, as shown in Figure 3.

A number of draft links is provided so that the forward propelling force is delivered to the ends of each evener bar section 1. To this end, three links 31, 32 and 33 extend diagonally rearwardly and at their rear ends are anchored to the associated eyebolts or hitch members 25, the rear ends of which, as described above, are fixed to the rear of the associated pair of connecting plates. Laterally outwardly of the links 31—33 are outside draft links 34 and 35, and the forward ends of the draft links 31, 32 and 33, together with the outside draft links 34 and 35, are arranged with their forward ends, each of which is formed as an eye, disposed one above the other in alignment so as to receive a generally vertically disposed hitch pin or bolt 39. This bolt also receives upper and lower hitch plates 41 and 42 which are connected by bolts 43 with a drawbar 44 of a tractor, or to some other source of traction.

Each of the outermost links 34, 35, referred to above, consists of several sections 36, 37 and 38, preferably connected together by one or more links, as indicated at 45, which are disposed in substantially fore and aft alignment with the hinge constructions 6, so as to permit the outermost evener bar sections to be folded over into the position shown in Figure 3.

The rear or laterally outermost end portions of the links 34 and 35 are connected to the laterally outer ends of the outermost evener bar sections 1, but since there are no other evener bar sections to be attached, either rigidly or pivotally, to the outer ends of the outer sections, the connecting eyebolts 11 and 25 are fastened directly to the outer ends of the outer hitch bar section 1.

While I have shown the hitch bar sections 1 as channels with the flanges turned upwardly, if desired the evener may be operated with the flanges turned downwardly. Also, the evener bar sections 1 may be formed of shapes other than channels. For example, the members 1 may be formed of pipe sections.

In operation, the harrow sections 14 are connected to the draft links 13 in any suitable manner, and if desired, the outermost evener bar sections may be rigidly bolted to the connecting plates 8 and 9 of the hinge means 6, but preferably, the bolt 22 (Figure 3) is placed so as to serve as a stop member while the outer or pivoted evener bar section is permitted to swing about the eyebolt 11 as an axis, the bolt 22 serving as a stop, as aforesaid. Thus, when it is desired to drive the harrow through a relatively narrow gate or other passage, the outer harrow sections, together with the associated evener bar sections, are swung upwardly and inwardly laterally of the harrow, about an axis passing generally through the hinges 6 and the associated connecting links 45.

In transmitting the draft to the harrow sections, the evener bar construction of the present invention provides an arrangement in which the joints are maintained tight. It will be noted, first, that the draft pull will be transmitted through the links 31—33 to the associated eyebolts or hitch members 25, the rear ends of which are rigidly connected to the associated rear connecting plates 8, each eyebolt 25 being movably disposed in an opening 46 in the forward connecting plate 9. On the other hand, the eyebolts 11 by which the draft pull is transmitted to the harrow sections 12 through the links 13 pass loosely through the rear connecting plates 8 and are anchored at their forward ends to the ends of the forward connecting plates 9. Therefore, the draft force tends normally to draw the connecting plates 8 and 9 toward one another, which causes them to bear firmly against the adjacent ends of the associated evener bar sections 1. Thus, there is little opportunity for the parts to become loose at the joints. The evener bar sections may be brought into alignment by adjusting the nuts 26 and 27 one way or the other on the eyebolt 25 thus bringing that part of the evener bar toward or away from the associated draft link. This adjustment means is provided at the connections at each end of each inner evener bar section, irrespective of whether the connections permit the evener bar sections to pivot.

It will be noted that the connecting plates 8 and 9 are all identical, and that the various evener bar sections 1 are also identical. This materially reduces the cost of manufacture. It will also be noted that the outer evener bar sections 1 do not pivot on the hitch member, and therefore they do not tend to turn that member, which if permitted to occur might cause the draft links to become entangled. Pivotal movement of the swingably mounted evener bar sections takes place about pivots spaced from the hitch members to which the draft links 31—33 are connected.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A folding evener comprising a pair of evener bars adapted to be disposed in aligned end for end relation, a pair of connecting plates disposed at the front and rear sides of adjacent ends of said evener bars, said connecting plates being apertured, a hitch member extending loosely through an aperture in the front connecting plate and rigidly connected with the rear connecting plate, said hitch member passing between the adjacent ends of said evener bars, and draft members extending loosely through apertures in the rear connecting plate, through apertures in the adjacent ends of said evener bars and connected at their forward ends, respectively, to the ends of the front connecting plate whereby a forward pull transmitted to the rear connecting plate by said hitch member is transmitted through the adjacent ends of the evener bars to the front connecting plate, and thence to the forward ends of the draft members, whereby the forward pull tends to maintain said connecting plates tightly against said evener bars, one of said draft members serving as a pivot for the associated evener bar.

2. A folding evener as defined in claim 1, further characterized by means fixing said connecting plates to the other evener bar so as to prevent pivotal movement of the connecting plates relative to said other evener bar about the draft member associated therewith.

3. A hinge construction for adjacent bars of a folding evener or the like, comprising a pair of plates adapted to be disposed on the front and rear sides of the evener bars, a hitch member connected loosely with one of said plates, means rigidly connecting said hitch member with the other of said plates so as to be held against rotation with respect thereto, and means connecting said plates adjacent their opposite ends with said evener bars.

4. A hinge construction for adjacent bars of a folding evener or the like, comprising a pair of apertured plates adapted to be disposed on the front and rear sides of adjacent ends of the evener bars, a hitch member passing between the ends of said bars and through an aperture in the front plate, means fixedly connecting the rear end of said hitch member to the rear plate to transmit draft force thereto, a pair of draft members extending loosely through apertures in the rear plate and connected at their forward ends to said forward plate, whereby the transmission of draft forces from the hitch member to the rear plate and from the rear plate to the draft members through said forward plate serves to compress said evener bars between said plates.

5. A hinge construction for adjacent bars of a folding evener or the like, comprising a pair of apertured plates adapted to be disposed on the front and rear sides of the evener bars and extending from the end of one bar to the adjacent end of the other bar, the adjacent ends of said evener bars being apertured at a plurality of points, bolt means connecting the ends of said plates with the ends of said bars for clamping the latter therebetween, said bolt means extending through certain of the apertures therein, a hitch member connected with the rear plate and extending forwardly through said front plate, and a pair of draft members connected with said front plate and extending rearwardly through said bars and said rear plates at one side of said clamping bolts.

6. A folding evener comprising a plurality of evener bars disposed in alignment when in normal working position, pairs of plates disposed at front and rear sides of said bars and connecting adjacent ends thereof, means fixing each pair of plates to one end of one of the two bars connected thereby, means pivoting the adjacent end of the other bar to the adjacent ends of said plates, and means serving optionally as means for preventing said other bar from pivoting and as means for limiting the pivotal movement of said other bar relative to said plates.

7. In a folding evener, a hinge construction for connecting two adjacent members thereof, comprising a pair of connecting plates disposed on opposite sides of said members and connected therewith, and a hitch member extending loosely through one of said plates and fixed to the other.

8. In a folding evener, a pair of substantially identical bars, each having a pair of holes in their adjacent ends, a pair of substantially identical connecting plates disposed on opposite sides of the adjacent ends of said bars, each of said plates having at least four holes therein, a pair of securing means passing through two of the holes in each plate and through the two holes in one bar for fixing said plates to said one bar, a pivot passing through one of the holes in the other bar and through one of the other two holes in each plate, whereby said other bar is pivotally connected with said one bar, and means adapted to be inserted through the fourth hole in each plate and engageable with said other bar to limit pivotal movement of the latter.

9. A folding evener comprising a pair of evener bars adapted to be disposed in aligned end for end relation, a pair of connecting plates disposed at the front and rear sides of adjacent ends of said evener bars, said connecting plates being apertured, a hitch member extending loosely through an aperture in the front connecting plate and rigidly connected with the rear connecting plate, said hitch member passing between the adjacent ends of said evener bars, and draft members extending loosely through apertures in the rear connecting plate, through apertures in the adjacent ends of said evener bars and connected at their forward ends, respectively, to the ends of the front connecting plate whereby a forward pull transmitted to the rear connecting plate by said hitch member is transmitted through the adjacent ends of the evener bars to the front connecting plate, and thence to the forward ends of the draft members, whereby the forward pull tends to maintain said connecting plates tightly against said evener bars.

10. A folding evener comprising a pair of evener bars adapted to be disposed in aligned end for end relation, a pair of connecting plates disposed at the front and rear sides of adjacent ends of said evener bars, a hitch member movable relative to the front connecting plate and rigidly connected with the rear connecting plate, and draft members movable relative to said rear plate and connected at their forward ends, respectively, to the ends of the front connecting plate whereby a forward pull transmitted to the rear connecting plate by said hitch member is transmitted through the adjacent ends of the evener bars to the front connecting plate, and thence to the forward ends of the draft members, whereby the forward pull tends to maintain said connecting plates tightly against said evener bars.

11. A hinge construction for adjacent bars of a folding evener or the like, comprising a pair of apertured plates adapted to be disposed on the front and rear sides of adjacent ends of the evener bars, a hitch member passing through an aperture in the front plate, means fixedly connecting the rear end of said hitch member to the rear plate to transmit draft force thereto, a pair of draft members extending loosely through apertures in the rear plate and connected at their forward ends to said forward plate, whereby the transmission of draft forces from the hitch member to the rear plate and from the rear plate to the draft members through said forward plate serves to compress said evener bars between said plates.

12. A folding evener comprising a plurality of evener bars disposed in alignment when in normal working position, pairs of plates disposed at front and rear sides of said bars and connecting adjacent ends thereof, a forwardly extending hitch member connected to the central part of each rear plate, and rearwardly extending draft means connected to opposite end portions of each front plate at substantially equal distances from the associated forwardly extending hitch member.

13. A folding evener comprising a plurality of evener bars adapted to be disposed in aligned end-to-end relation, a pair of plates disposed on opposite sides of said bars and connected with one of said bars, each plate having a portion extending above the other bar, means pivoting said other bar to said plates, and means extending through said plate portions to serve as a stop limiting the pivotal movement of said other bar in one direction relative to said plates.

CARL G. STRANDLUND.